United States Patent [19]

Skidmore

[11] 4,277,296
[45] Jul. 7, 1981

[54] PNEUMATIC TIRE AND METHOD OF MAKING SAME

[76] Inventor: Frank O. Skidmore, 2513 Third St., Cuyahoga Falls, Ohio 44221

[21] Appl. No.: 80,114

[22] Filed: Sep. 28, 1979

Related U.S. Application Data

[63] Continuation-in-part of Ser. No. 834,246, Sep. 19, 1977, Pat. No. 4,196,764.

[51] Int. Cl.³ .......................................... B29H 17/20
[52] U.S. Cl. ........................... 156/128 R; 156/128 N; 152/358; 152/361 R
[58] Field of Search ................. 156/96, 126, 127, 128, 156/129, 130; 152/361 R, 357 R, 358, 359

[56] References Cited

U.S. PATENT DOCUMENTS

| 3,563,295 | 2/1971 | Hough | 152/361 R |
| 3,607,497 | 9/1971 | Chrobak | 156/95 |
| 3,841,376 | 10/1974 | Paulin et al. | 152/361 R |
| 3,951,719 | 4/1976 | Hough | 156/96 |
| 3,991,803 | 11/1976 | Praszel | 152/361 R |
| 4,040,464 | 8/1977 | Skidmore | 152/361 R |
| 4,135,565 | 1/1979 | Vander Burg | 152/361 R |
| 4,137,112 | 1/1979 | Hedlund | 156/96 |

*Primary Examiner*—John E. Kittle

*Attorney, Agent, or Firm*—Oldham, Oldham, Hudak & Weber Co.

[57] ABSTRACT

The invention relates to the use of reinforcing cords associated with the pneumatic tire to control radial force variations in the tire under loaded conditions, and the method of applying such reinforcing cords woven in a warp and weft relationship cut on a bias or circumferentially to form a belt, such belt extending past the lateral edges of the present belt and applied to the tire either in its new form or as a retreaded tire from an old carcass. It can be extruded into the tread material as it is initially formed. Basically, the cords are made from a very high strength material, either synthetic, wire, or the like, having a tensile strength of approximately 125 psi each, with the cords spaced at approximate ¼ inch spacings. Hence, there will be four cords, more or less, per inch. The cords could be increased to 150 or more pounds each. There will be approximately 20 to 40, depending upon the width of the tread area of the tire involved and the width of the normal belt ply in the radial or bias ply tire involved. This type of construction serves as an extra belt of many hundred pounds tensile strength, thereby controlling radial force variations in the tire, maintaining the integrity of the belt plies already in the tire, and is particularly applicable to controlling these forces in retreaded tires and particularly retreaded radial tires by preventing delamination of the retread at the old belt ply area.

4 Claims, 5 Drawing Figures

PNEUMATIC TIRE AND METHOD OF MAKING SAME

CROSS-REFERENCE

This application is a continuation-in-part of my earlier application bearing U.S. Ser. No. 834,246 which was filed on Sept. 19, 1977, now U.S. Pat. No. 4,196,764, entitled "PNEUMATIC TIRE AND METHOD OF MAKING SAME."

BACKGROUND OF THE INVENTION

Heretofore, it has been known to produce normal bias ply and radial tires with fabric or steel belts incorporated therein, which belts are designed to make the tread run flatter and give better road contact, and which belts also are alleged to increase the overall life-wearing characteristics of the tire.

However, these belts are always of bias, ply-type construction, and therefore do not completely control radial force variations in the tire, which force variations lead to a bumpy and uneven ride in the vehicle upon which the tire is mounted. Force variations have become an increasing problem in radial tires because of the much longer and heavier treads thereof, and further because these tires have a larger overall footprint configuration where the tire meets the road and, hence, tend to have more susceptibility to radial force variations. It is further believed more difficult to control the exact circular or circumferential nature of the radial tires, and it is this factor which I believe leads to increased difficulty with such force variations in radial tires.

It has further been a problem in retreaded bias or radial tires having the fabric or steel belts incorporated therein, that a delamination occurs at the lateral edges of the belts with respect to the retreaded portion, thereby making the retread ineffective and substantially cutting the life of the retread. Such delaminations also occur in radial tires, particularly at the lateral edges of the belts even in new tires, because of a weakened area occurring in the radial tire at these areas due to greater flexing, and the fact that the outer tread rubber cannot adhere through these lateral edges because of the greater flexing during the running of this tire.

It should be understood that the instant invention represents an improvement over the siping arrangement and belt procedure of my own prior U.S. Pat. No. 4,040,464 that issued on Aug. 9, 1977, wherein the siping material actually forms a reinforcing belt right at the base of the tread design which I have found does not give as good a reinforcing ability as when this belt is positioned between the bottom of the tread design and the belts in the tire, as shown in my FIGS. 1 through 3 herein. This is partially because the siping material is not vulcanized to rubber tread. In addition, the siping arrangement did not extend over the lateral edges of the belt plies and, hence, the delamination problem at that point was not solved.

OBJECTS OF THE INVENTION

Based on the above, it is the general object of my invention to achieve an improvement in radial force variation characteristics of pneumatic tires, particularly adaptable to radial tires, and as well as to eliminate or substantially reduce the delamination effect taking place at the edge of the belts in radial or bias ply tires by the provision of reinforcing cords woven together as in a fabric, being included in the final cure process as a bias cut belt of the construction of radial tires to maintain a great longitudinal tensile strength at the circumference of the tire, as well as at the lateral edges of the normal fabric or steel belts incorporated therein, thereby improving force variations and delamination characteristics.

It is further an object of my invention to provide this tensile strengthening cord arrangement in an economical and efficient fashion for new and recapped tires.

It is a further object of my invention to incorporate in conjunction that the reinforcing cords is of an open weave, spaced to permit bonding of the new tread material to the buffed surface of the tire in a retreaded operation.

It is further an object of my invention that the strengthening cords may run circumferentially or bias, and still achieve the prevention of delamination at the edges of the belts.

A further object of the invention is to improve the out-of-round or unbalanced radial force condition in tires and thereby give greater mileage in both gas savings and service.

A further object of the invention is to provide a process to add the tensile strengthening cord arrangement in an economical and efficient fashion for new and recapped tires which includes incorporating the strengthening cords into an uncured rubber matrix by calendaring or extruding to provide intimate contact relationship to the cords and facilitate laying this uncured rubber strip into the tire construction for good bonding with the basic tread and carcass of the tire.

A further object of the invention is to provide the tensile strengthening cord material into an uncured rubber matrix to facilitate its application in basically a double-faced material to be cut either circumferentially or on a bias allowing the strips to fully and snugly conform around the shoulder of the tire, thereby greatly reducing force variations at the shoulder area.

Another object of my invention is to incorporate a rubber matrix around the tensile strengthening cord material to facilitate positioning of the material between the tread and carcass, and which matrix, when cured, is of a compatible durometer hardness with the tread and carcass material to eliminate or substantially reduce relative movement under usage caused by shear action if there were a difference in durometer hardness. In other words, the movement of tread, rubber matrix with cord material, and carcass is in unison as the tire flexes when passing through the footprint, without internal shear movements to build heat and result in tire delamination and failure.

The aforesaid and other objects of the invention which will become apparent in the description which follows are achieved by a method of preparing a pneumatic tire having a tread, a carcass, sidewalls, and a strip of scrim material positioned between the base of the tread and carcass which is characterized by the scrim material, including warp and weft cords which extend to substantially parallel straight relationship to each other to form a belt around the full circumference of the tire, said cords having great tensile strength and being subject to minimal elongation within their designed tensile strength, said cords acting to reduce radial force variations in the tire under operating conditions, and said cords being joined at their intersections which comprises the steps of: (a) providing the scrim material in an intimate matrix relationship with at least one layer of uncured rubber material, (b) applying the scrim and uncured rubber material layer at the desired position on the carcass over the full circumference thereof while stretching it to achieve a snug positioning and intimate contact of the uncured rubber material to the carcass, and (c) applying the tread material over the scrim material and curing the tire to effect vulcanization and a bonded relationship between the tread, the uncured layer intimately combined with the cords, and the carcass.

DESCRIPTION OF THE DRAWINGS

For a better understanding of the invention, reference should be made to the accompanying drawings, wherein.

DETAILED DESCRIPTION OF THE PREFERRED EMBODIMENTS

Figure 1:
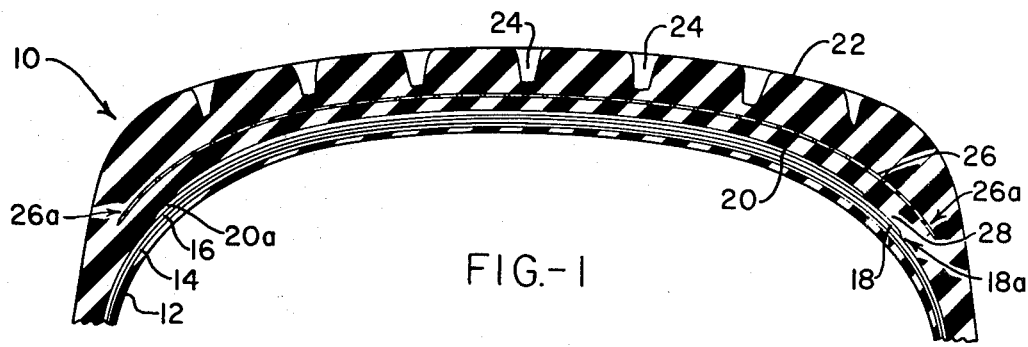
FIG. 1 is a cross-sectional illustration of a tire carcass having two belt plies with the improved strengthening cord arrangement of the instant invention positioned between the depth of the tread pattern and the belts.

Now, with reference to the embodiment shown in FIG. 1 of the drawings, the numeral 10 illustrates a tire carcass generally comprising a carcass section 12 having fabric or wire bias plies 14 and 16 making it up in the usual manner for either a bias ply tire or a radial tire. On top of the carcass are two belt plies, these being illustrated by numerals 18 and 20. Preferentially, these belt plies can be made from metal woven strands, or they can be of synthetic fibers, or the like, and the use of these belts is well understood and known by anyone skilled in the art.

The tire tread is illustrated by numeral 22, and into the tread goes a tread design 24 to give the tire proper traction and gripping on the road.

The essence of my invention is achieved by providing an extra belt illustrated generally by numeral 26 that is positioned substantially between the bottom depth of the tread design 24 and the upper belt 20. Preferably, my belt extends completely down and over the lateral edges 18a and 20a of the belts as illustrated in the general area by numeral 26a. I have found that quite frequently a delamination begins to occur in the tire carcass at about the area indicated by numeral 28 because of the overlapping or positional arrangement of the belts 18 and 20. I have found that the use of the added belt 26 extending down well past the lateral edges 18a and 20a will substantially eliminate the delamination at area 28, particularly when a recapping procedure is utilized. This improvement is very important to the life of the retread, as well as the new tire; when in radial tires, delamination has been a frequent problem.

I have also found that the positioning of the additional belt 26 between the belts 18 and 20 and the bottom of the tread design 24 adds a substantial degree of stability within the rubber tire tread 22 so as to eliminate squirm of the tread portion 24 on the road surface and thereby improves tire wear as well as gas mileage.

Figure 2:
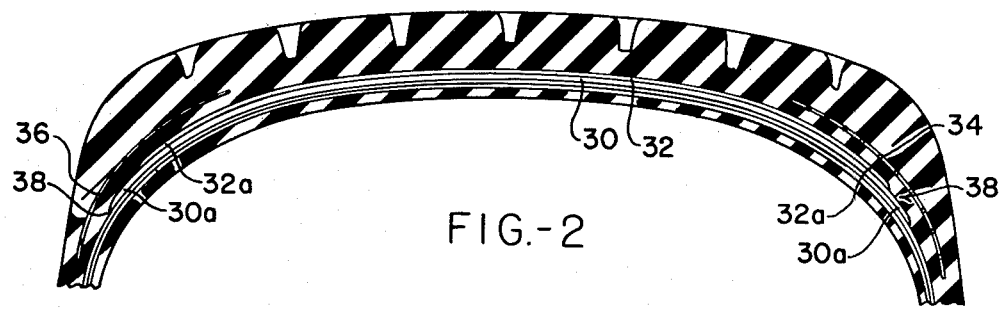
FIG. 2 is a carcass similar to that shown in FIG. 1 except having the strengthening cords positioned over only the lateral edges of the belts.

FIG. 2 illustrates a slightly modified embodiment of the invention wherein the numerals 30 and 32 illustrate the conventional belts, and numerals 34 and 36 illustrate added belts in accordance with the concept of the invention which extend fully over the lateral edges 30a and 32a of the belts as illustrated. The belts 34 and 36 are designed to cover substantial equal distances from the lateral edges 30a and 32a as illustrated so as to provide a uniformed extension over that area 38 which tends to delaminate. It has been found that this structure is particularly beneficial on a retreaded radial or bias ply tire and substantially eliminates any of the delamination occurring with the tire at the lateral edges of the belts.

Figure 3:
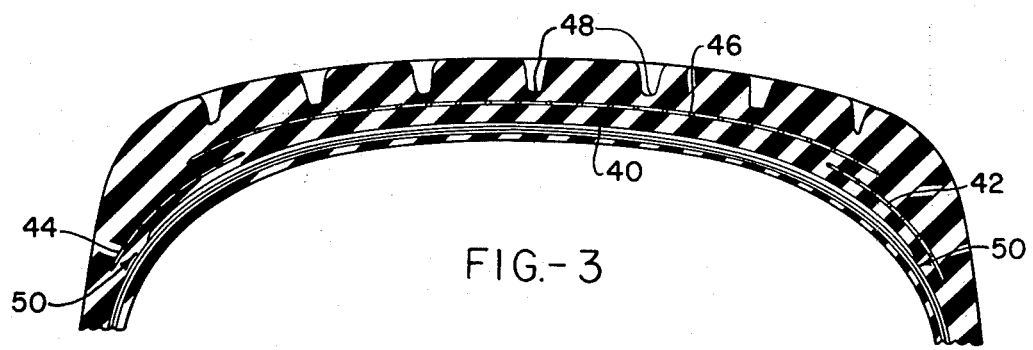
FIG. 3 is a cross-sectional illustration of a tire carcass having a modified strengthening cord arrangement over both the lateral edges of a single belt and between the belt and the tread pattern.
Figure 4:
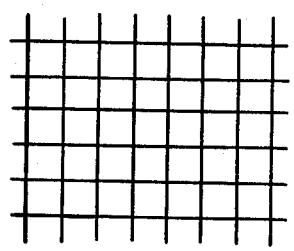
FIG. 4 is a plan view of the strengthening cords showing the make-up as scrim material.

FIG. 3 illustrates a modified embodiment of the invention incorporating only a single standard belt 40 with lateral edge covering belts 42 and 44 and a central belt 46 that is positioned between the belt 40 and the bottom 48 of the tread design. The side belts 42 and 44 prevent the delamination in the areas 50 whereas the belt 46 controls radial force variations by being positioned about midway between the belt 40 and the bottom of the tread design 48 to thereby eliminate tire squirm and increase gas mileage and tire longevity.

The new material which I utilized in the various new belts of my invention illustrated in FIGS. 1 through 3 is preferably in an open weave, spaced between warp and weft, and preferably bonded or secured at the intersections. The addition of the cord belt material can be to any tire belted or not belted, radial or bias-ply built and, hence, is applicable to new tires as well as retreads. The cords may be run circumferentially or at a bias. The cords in the belts should be of a very strong material such as Kevlar as made by E. I. DuPont, or a similar material, and could be of wire also. Particularly, it is believed that the cord should have at least 125 psi tensile strength, and can vary between 100 to 175 psi tensile strength. The positioning of the new belt between the present belts and the bottom of the tread design helps to true the out-of-round condition in a tire and give greater mileage and gas savings. With respect to the retread, the extra belt can be simply extruded into the retreading material at the source of the supplier of the retread material.

Preferably, the extra belt will be added by a pressure sensitive adhesive holding it in place on the top of the carcass. The tread rubber will be applied prior to vulcanization. The adhesive application will be of vulcanizing adhesives so the cords comprising the belt will be integrally formed as part of the tire and provided in a nonmovable relation to the rubber which surrounds them.

It should be understood that a great many tires, when they are not in motion, may appear to be very nearly round. However, when they are in actual operation at 50 or 60 miles per hour, the tire will become elliptical in shape and, even though it is a belted tire, the belt will stretch more in some places than in other places. The addition of my belt between the normal belt and the bottom of the treads will tend to true this elliptical or out-of-round condition since, at speeds of 50 to 60 miles per hour, it stabilizes the tread rubber preventing it from squirming and thereby preventing elongation or growth caused by the force variations within the tire, as the cords in this additional belt will have a tendency to squeeze the material to prevent such separation or squirming movement. Any movement of the tread rubber, either lateral or longitudinal, has a tendency to widen or lengthen the open spaces of the scrim. Therefore, this restriction caused by the scrim being vulcanized to the rubber greatly reduces the cause of separation.

Preferably, the material with the cords comprising the belts will have an open weave of about ¼ inch spacing between the warp and the weft, and preferably will have material of equal strength in both the warp and weft directions. As indicated above, this can be the Kevlar material by E. I. DuPont, or a similar material or wire.

Figure 5:
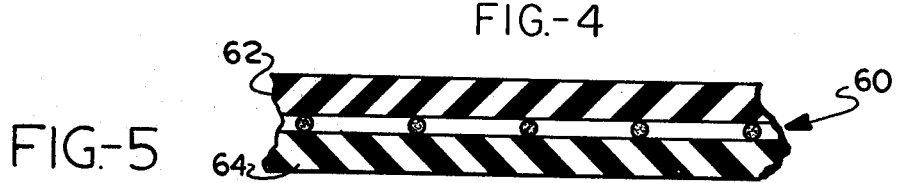
FIG. 5 is an end cross-sectional view of the strengthening cords showing their make-up in a rubber matrix that facilitates the application of the strengthening cords into either a new or retread tire, which facilitates construction.

I have found that it facilitates the application of the strengthening cords comprising the belts to either the retread or the new tire configuration by embedding the cords into an uncured rubber matrix, all of which is best depicted in FIG. 5 wherein the particular strengthening cord belt is indicated generally by numeral 60, and which illustrates this in a laminated matrix arrangement with two uncured rubber layers 62 and 64, respectively. I have found that the layers 62 and 64 can be approximately 1/32 to ⅛ inch thick, and will preferably be calendared into intimate, full-surrounding relationship with the open weave cord layer 60 so that the top and bottom surfaces 62 and 64 are pressed into intimate relationship with each other through the open weaves of the cord 60, by calendaring, preferably, or which could be also handled in an extrusion process, or dipped or sprayed to form the matrix. The dipped or sprayed technique may provide a more intimate relationship of the rubber to the cords.

In any event, I have found that with the layers 62 and 64 uncured, it provides an inherently tacky and compatible surface to be manually applied into position at the shoulder portions or across the tread of the tire to be readily and snugly engaged into positions illustrated into FIGS. 1 through 3 of the drawings herein. Preferably, the layers 62 and 64 cover both faces of the scrim with uncured cushioned gum, although it should be understood that only a single surface might need to be covered if that would still provide the compatible inherent interconnection of the rubber around all the cords of the open weave configuration. Preferably, I have also found that putting on some type of a protective release layer such as plastic or paper which can be peeled off of the uncured rubber gives a clean tacky surface to then allow application of the appropriately cut strip to the new tire or retread configuration by the tire builder or recapper, respectively. Hence, the laminated relationship of the cords to the uncured cushion gum or rubber material can be done at a central location and then the strips in various widths and bias configurations can be provided to the tire builder or recapper from the central laminating facility.

This technique is applicable to all truck and passenger tires which can have all or selected portions of the tread and shoulder areas covered with the double-faced material of FIG. 5 which is cut either circumferentially or on a bias so that the particular belts can be snugly stretched to fully engage over the selected portions of the tire. The bias cut is preferable for the shoulder portion because of the circumference variations.

In this regard, since there are many sizes of passenger tires, it should be understood that the distance is greater from the edge of the existing belt to the shoulder area on the larger tires so that the shoulder strips must be cut in several widths. The wider the shoulder strips, the greater the angle or bias of the warp cords must run so that when the tire builder or recapper is placing them into position, he gives the strips a general pull so that the material will fully expand to form snugly around the shoulder of the tire. This will form a shoulder strip when cured that will perform a dual purpose of holding down the edge of the existing belt, thereby reducing delamination and greatly reducing radial force variations at the shoulder area of the tire.

When speaking of bias angles, I am referring to angles up to 45°, but usually smaller angles of from 5° to 20° which will provide sufficient bias to allow a snug stretch to form fit the belt around the shoulder area. In some instances, where the belts will cover the shoulders of larger tires, the strips could perhaps be cut at a greater angle. In other words, though, the strip is tailored or cut at a bias to fit a specific tire. The operator or recapper will expand the length of the strip by gently pulling it to its proper length. In those instances where the tire is almost flat, as along the tread area, it is not necessary to use a bias strip, but it is really where you are going over the shoulder areas itself and there is a greater circumference in the shoulder area up near the tread than there is in the shoulder area down near the sidewall, that the slight bias configuration should be used to allow the slight pulling to in effect expand the strip along the larger circumference near the tread and allow a snug fit without gaps or bunching of the scrim material towards the side wall portion of the shoulder. The slight bias configuration and the uncured nature of the layers 62 and 64 allows this slight pulling to achieve the snug fit desired. The uncured rubber, of course, then acts as a sticky or adhesive contact to hold the layer in position in either the recapping or building process so that the snug fit is maintained which keeps all the cords in a fully elongated position and, hence, achieves the results of decreasing possibilities of delamination at the edges of the existing belts, and reducing radial force variations.

It is another feature of the invention that the matrix encompassing the cords formed by layers 62 and 64 be of a compatible durometer to the tread material and tire carcass to eliminate or substantially reduce relative movement under usage caused by shear action if there were a difference in durometer hardness. In other words, the movement of tread, rubber matrix with cord material, and carcass is in unison as the tire flexes when passing through the footprint, without internal shear movements to build heat and result in tire delamination and failure.

The concept of making the new scrim material in the laminated relationship with the uncured gum or rubber, providing it with a protective coat and putting it up in rolls, for example, greatly facilitates its use and application to the tire to achieve the objects of the invention.

While in accordance with the patent statutes only the best known embodiments of my invention have been illustrated and described in detail, it is to be particularly understood that my invention is not limited thereto or thereby, but that the inventive scope is defined in the appended claims.

What is claimed is:

1. A method of preparing a pneumatic tire having a tread, a carcass, sidewalls, at least one belt, and a strip of scrim material positioned between the base of the tread and carcass over the full circumference thereof and across a substantial width of the tread which is characterized by the scrim material, including perpendicularly related warp and weft cords with respective cords extending in substantially parallel straight relationship to each other in an open weave spaced between warp and weft to form a belt around the full circumference of the tire, said cords having great tensile strength and being subject to minimal elongation within their designed tensile strength, said cords acting to reduce radial force variations and reduce squirm and friction between tread and carcass in the tire under operating conditions, and said cords being joined and interlocked at their intersection which comprises the steps of:

(a) providing the scrim material fully embedded in at least one layer of uncured rubber material to achieve an intimate matrix relationship, (b) applying the scrim and uncured rubber material layer at the desired position on the carcass over the full circumference thereof and width beyond the lateral edges of the belt while stretching it to achieve a snug positioning and intimate contact of the uncured rubber material to the carcass, and (c) applying the tread material over the scrim material and curing the tire to effect vulcanization and a bonded relationship between the tread, the uncured layer intimately combined with the cords, and the carcass.

2. A method according to claim 1 which includes the step of providing a second layer of uncured rubber material opposite said first layer whereby the scrim material is in a matrix between the two layers.

3. A method according to claim 1 which includes the step of positioning the scrim material in a bias configuration in the matrix within the uncured rubber material.

4. A method according to claim 1 which includes providing that the durometer hardness of the cured matrix is compatible with the tread and carcass to eliminate internal squirm and friction between tread and carcass of the operating tire.

* * * * *